UNITED STATES PATENT OFFICE.

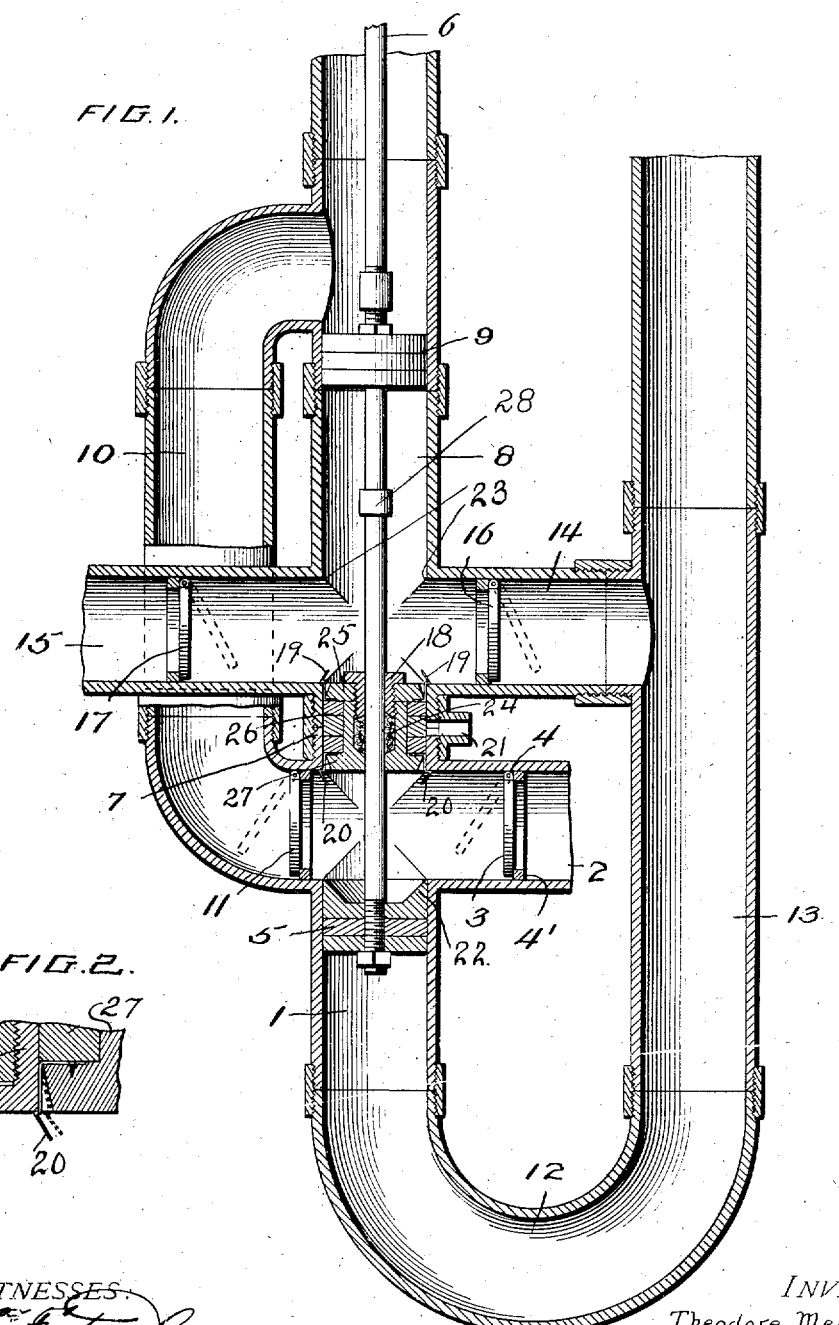

THEODORE MEIXNER, OF WINCHESTER, WASHINGTON.

PUMP.

987,313.  Specification of Letters Patent.  Patented Mar. 21, 1911.

Application filed August 22, 1910. Serial No. 578,293.

*To all whom it may concern:*

Be it known that I, THEODORE MEIXNER, a citizen of the United States, residing at Winchester, in the State of Washington, have invented certain new and useful Improvements in Pumps, of which the following is a specification.

This invention relates to improvements in pumps and embraces the construction of a piston pump having an arrangement of piston chambers and valves whereby the operating pistons will pump water on the down and upward strokes thereof.

One of the objects of the invention is the construction of a simple pump having means whereby a plurality of pistons can be operated so that water will be pumped on the down and up strokes of the pistons.

In the accompanying drawing Figure 1, illustrates a vertical sectional view of the improved pump. Fig. 2, illustrates an enlarged section of the gasket 27, showing one of the springs 20, 20.

Referring to the drawing, 1 denotes a piston chamber, which is connected with an inlet port or pipe 2, which pipe is controlled by an inwardly opening flap or check valve 3, which valve is pivotally supported at 4, and engages with an abutment or seat 4'. In the piston chamber 1, a piston 5, carried by a piston rod 6, operates. The piston rod 6, extends slidably through a gasket 27, removably seated in the wall 7, and through a piston chamber 8, and carries on its upper end a piston 9, operating in the chamber 8. The upper end of the pipe forming the upper piston chamber is connected by a pipe or chamber 10, with the inlet port or pipe 2, and is provided with a check or flap valve 11, adapted to open in the same way as the valve 3, and which is arranged in similar manner. The lower end of the piston chamber 1, is connected by a U-shaped pipe 12, to a discharge or lift pipe 13. The lift pipe 13, connects by a lateral pipe 14, with the piston chamber 8, and with an inlet port or pipe 15. The pipe 14, is provided with an outwardly opening check or flap valve 16, which is similarly arranged to the previously described valves, and the inlet port or pipe 15, is controlled by a check or flap valve 17, arranged as the other valves, but opening inwardly. The said gasket comprises a body portion 27, washers 26, an annular cap 25, a packing chamber 24, and a bushing 18, and is supported against the wall 7, through the agency of spring members 19, 19, and 20, 20. The spring members 20, 20, are adapted to recede inwardly for the purpose of allowing the said gasket 27, to pass out the chamber 8 when so desired, when the inwardly tapering washer 22, is drawn upwardly and contacts same, and the spring members 19, 19, are adapted to recede inwardly for the same purpose where they come in contact with sides of pipe 8, as indicated by the numeral 23. An exhaust port 21, is provided for the purpose of draining chamber 8, when the gasket 27, is removed. A nut 28, is mounted on the piston rod 6, for the purpose of abutting against the bushing 18, of the gasket 27, and forcing same in position in the wall 7.

On the down stroke of the pistons 5, and 8, the valve 3, will open inwardly so as to allow water to be drawn into the piston chamber 1, and in the pipe 2, while the water which has on the up-stroke of the pistons entered the pipe or port 15, and the chamber 8, will be forced through the pipe 14, into the lift pipe 13. On the up-stroke the water that has filled the piston chamber 1, and the pipe 2, will be forced through said pipe 10, out through the upper end of the chamber 8, which forms a lift pipe.

Having described my invention, that which I claim and desire to protect by Letters Patent is,—

In a pump of the character described, comprising a plurality of piston chambers, arranged one above the other, in a vertical plane, a piston rod extending through said piston chambers and adapted to operate a piston in each of said chambers, a removable gasket surrounding the piston rod and adapted to separate the said chambers and so constructed that it can be automatically displaced by the lifting of the said piston rod from the pump.

In testimony whereof I affix my signature in presence of two witnesses.

THEODORE MEIXNER.

Witnesses:
DANIEL E. McEWEN,
CHARLES A. McEWEN.